May 14, 1968  H. L. REKATE ET AL  3,383,228

WASTE DISPOSAL

Filed Aug. 27, 1963  3 Sheets-Sheet 1

INVENTORS
H. L. REKATE
A. M. HEIN
BY
ATTY.
AGENT.

United States Patent Office 3,383,228
Patented May 14, 1968

3,383,228
WASTE DISPOSAL
Harold L. Rekate, 811 Chesapeake Ave., Annapolis, Md. 21403, and Allen M. Hein, Rte. 1, Box 85, Arnold, Md. 21012
Filed Aug. 27, 1963, Ser. No. 305,016
10 Claims. (Cl. 106—84)

ABSTRACT OF THE DISCLOSURE

Apparatus and method for disposal of garbage and sewage in the form of a solid, hard, cohesive, odorless and inert block of ashen material having a specific gravity greater than water, comprising the steps of destructive distillation of the waste material at high temperature and pressure; mixing with the residual mass a suitable binding agent; and compacting the mixture into a block.

---

The invention described herein may be manufactured and used by or for the Government of the United States of America for governmental purposes without the payment of any royalties thereon or therefor.

The present invention relates to the treatment of waste material for its disposal or use in the form of essentially odorless, cohesive, hard, non-flammable blocks of a density considerably greater than the density of water.

For the purpose of undetected disposal of waste products for vessels at sea, particularly submarines, there is no known previous method and means whereby waste such as garbage and human waste may be disposed of without detection by virtue of residual odor or flotsam.

On land, prior arrangements for disposal of waste such as garbage and sewage typically result in at least some of said waste finding its way into wells and waterways which become increasingly polluted.

By the present invention, the problem of safely disposing of seaborne and landborne waste such as garbage and sewage is overcome by unique arrangements which provide safely disposable end-products. In one form, the end-product may be a solid, hard, cohesive odorless and essentially inert block of ashen material having a specific gravity at least greater than that of water. The block is also essentially impervious to water, earth and the atmosphere, and does not disintegrate upon prolonged exposure thereto. Such a block is produced in the following manner:

(1) subjecting a mass of raw waste material such as garbage or sewage to "destructive distillation" (i.e., the decomposition of material by heat and simultaneous removal or distillation of the volatile products) whereby there remains a residual mass of essentially inert, loose ashen particles;

(2) mixing with said residual mass a suitable binding agent; and (3) compacting the mixture into a block.

Where it is not necessary or desirable that blocks be formed, steps (2) and (3) above may be omitted, it being understood that the residual mass of loose, inert ashen particles may be disposed of as ashes and used as land fill.

Accordingly, it is among the objects of the present invention to provide a novel method for processing waste material into odorless end-products of greater density than water; to provide virtually inert waste material end-products highly resistant to disintegration in natural surroundings of air, water and earth; to provide a novel arrangement of high temperature destructive distillation and compacting means for quickly and efficiently handling and processing waste material into cohesive dense blocks safely disposable in natural surroundings or usable as building construction elements; and to provide novel, non-polluting, non-contaminating odorless disposable end-products formed of waste material.

The foregoing objects as well as other objects, features and advantages of the present invention will be better understood by reference to the accompanying drawings in which like numerals represent like parts and in which.

Figure 1:
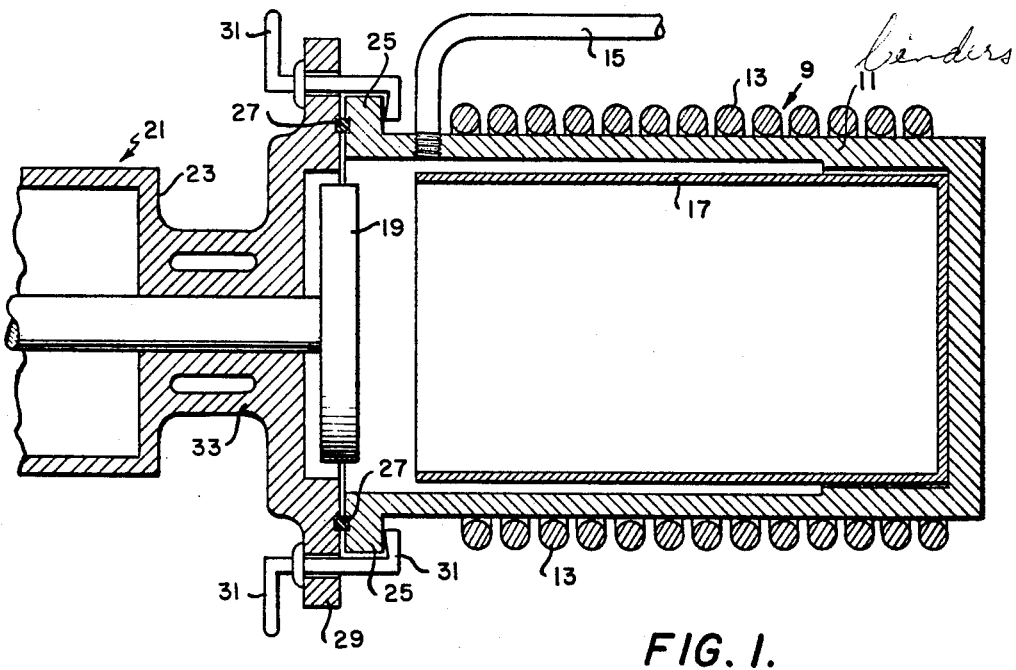
FIG. 1 is a view in cross section of one illustrative form of a waste material processing arrangement according to the invention.
Figure 2:
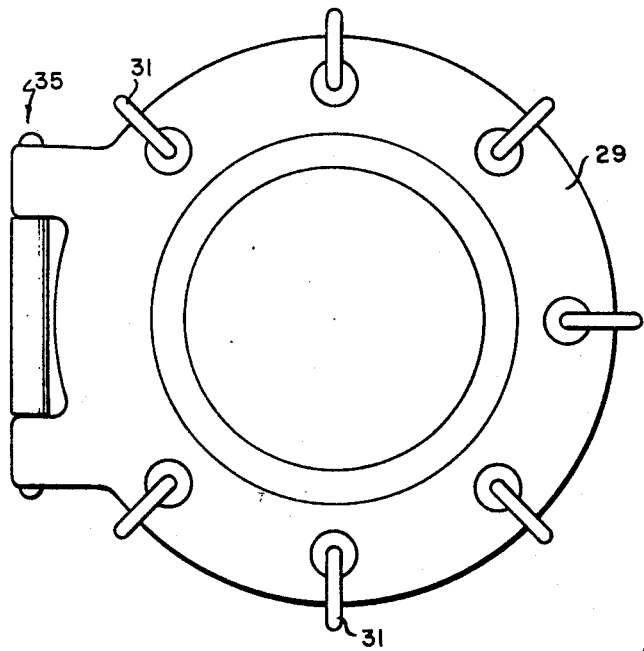
FIG. 2 is a view of one end of the embodiment shown in FIG. 1.

In FIGS. 1 and 2, there is depicted therein one exemplary form of apparatus particularly useful for submarine waste disposal, which may be employed according to the novel teachings herein, it being understood that the particular form of apparatus is shown only for purposes of illustration and not by way of limitation.

Referring to FIGS. 1 and 2, there is shown a heating unit 9 employing a cylindrical housing or shell 11 closed at its bottom and made of substantially non-magnetic heat conductive material such as stainless steel. The bottom portion of the housing 11 is sufficiently strong to withstand the working pressure differentials for producing the blocks according to the invention. The cylindrical housing or shell 11 is surrounded by copper "pancake" induction heating coils 13 in intimate contact therewith. The coils 13 may be energized by any suitable source of alternating current (not shown).

Near the upper end of the housing 11 is a vacuum conduit 15 fluidly coupled with the interior of the housing. The conduit 15 is connected to a suitable vacuum pump as indicated and provides educting means for removing all of the volatile gases which may be formed in the interior of the housing 11 during destructive distillation.

An electrically conductive waste material container 17 fits snugly within the bottom portion of the housing 11. The container 17 is made of magnetic material such as low carbon steel and need not be capable of withstanding high pressure differentials because the pressure differentials will be taken up by the sturdy bottom portion of housing 11.

The waste material container 17 is located by its snug fit in the housing 11 to receive a ram or piston 19. The piston 19 is reciprocatingly mounted in a piston actuating assembly 21. The piston 19 may be made of electrically and heat conductive material. The assembly 21 includes a housing 23 which removably abuts the open end of the housing 11 in opposing relation thereto.

Means are provided for forming a seal between the respective housings 11 and 23 when they are positioned in abutting relation. The open end of the housing 11 has a grooved flange 25 carrying a metallic O-ring or gasket 27 in its groove. The piston housing 23 has a flange 29 extending outwardly beyond the opposing flange 25. The overextending portion of the opposing flange 25 is provided with apertures for receiving conventionally designed cam shaped dog members 31. The dogs 31 serve to bring together the opposing flanges 25 and 29 for providing a pressure-tight seal. Of course, any other suitable means providing a pressure-tight seal may be employed.

As shown in FIG. 1, the piston 19 is reciprocatingly mounted in a conventional water cooled sealing neck portion 33 in the assembly 21.

Actuation of the piston 19 may be provided by any suitable means. The assembly 21 may be mounted in any suitable manner, for example, as by a supporting hinge 35 illustrated in FIG. 2 or by a mobile platform or other movable means for the purpose of separating the assembly 21 from the heating unit 9 to facilitate insertion and removal of the waste material container 17. Automatic means of any suitable design may be provided to operate the dogs 31 or whatever other sealing means are employed.

Because the induction coil 13 provides the greatest amount of induced current in the walls of the container 17, it may be desirable in certain circumstances to provide heat conducting means positioned along or near the central axis thereof for quicker and more even heating of the waste. Such means may take a variety of forms as illustrated in FIGS. 3, 4 and 5 respectively.

Figure 3:
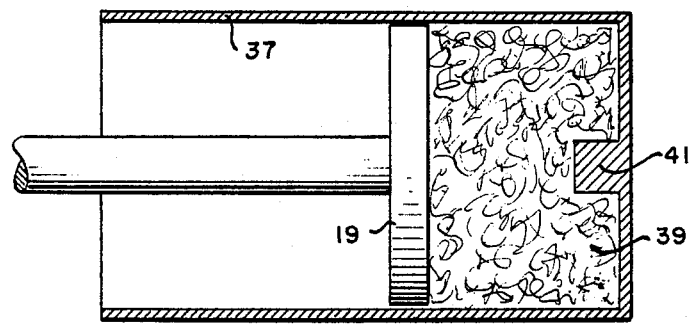
FIGS. 3, 4 and 5 are fragmentary cross sectional views showing various embodiments of the compacting piston and container for enhancing heat distribution in accordance with the invention.

In FIG. 3 a container 37 for waste material 39 is provided with a heat conductive magnetic axial rod or bar 41 integral with the container bottom. Of course, the rod or bar 41 has a length less than the final thickness of the block. This is illustrated in FIG. 3 wherein the piston 19 is shown in its position of greatest extension into the container 37.

Figure 4:
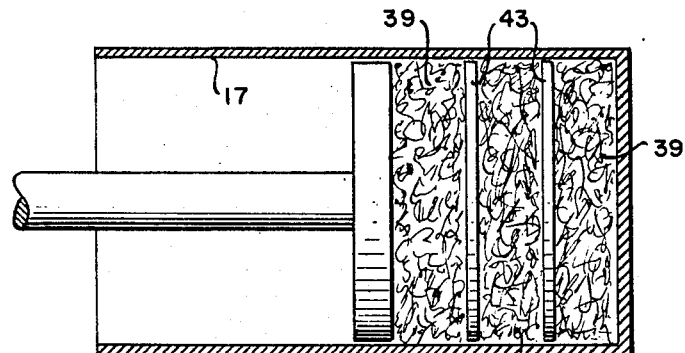

In the embodiment of FIG. 4, a plurality of heat-conducting magnetic discs 43 are interspersed transversely of the container 17 thus dividing up the waste material 39 into several layers. The discs 43 are placed into interspersed position as the waste material is built up in the container 17 prior to treatment.

Figure 5:
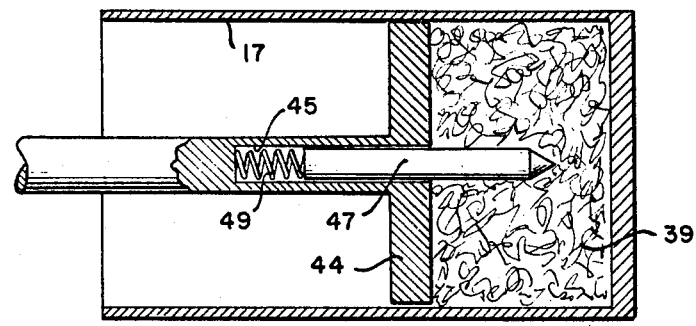

In the embodiment shown in FIG. 5, a waste material-compacting piston 44 is provided with an axial bore 45 in which is reciprocatingly mounted an electrically and heat conductive magnetic plunger 47 pointed at its exterior end. The plunger 47 is of the same axial length as the bore 45 and may have axial grooves or fins for greater heating efficiency. A spring 49 located between the inner end of the bore and the inner end of the plunger provides yieldingly urging means for the plunger. With the arrangement of FIG. 5, as the piston is pressed into the initially soft waste material 39, the pointed plunger pierces the soft waste material and provides extra heat due primarily to heat conduction through the piston and due slightly to eddy currents induced therein by the inducting heating coil 13. Obviously as the piston approaches the bottom of the container 17 and presses the heating waste material into a harder mass, the plunger 47 may retract into the bore 45. Thus the plunger 47 does not interfere with compaction.

Figure 6:
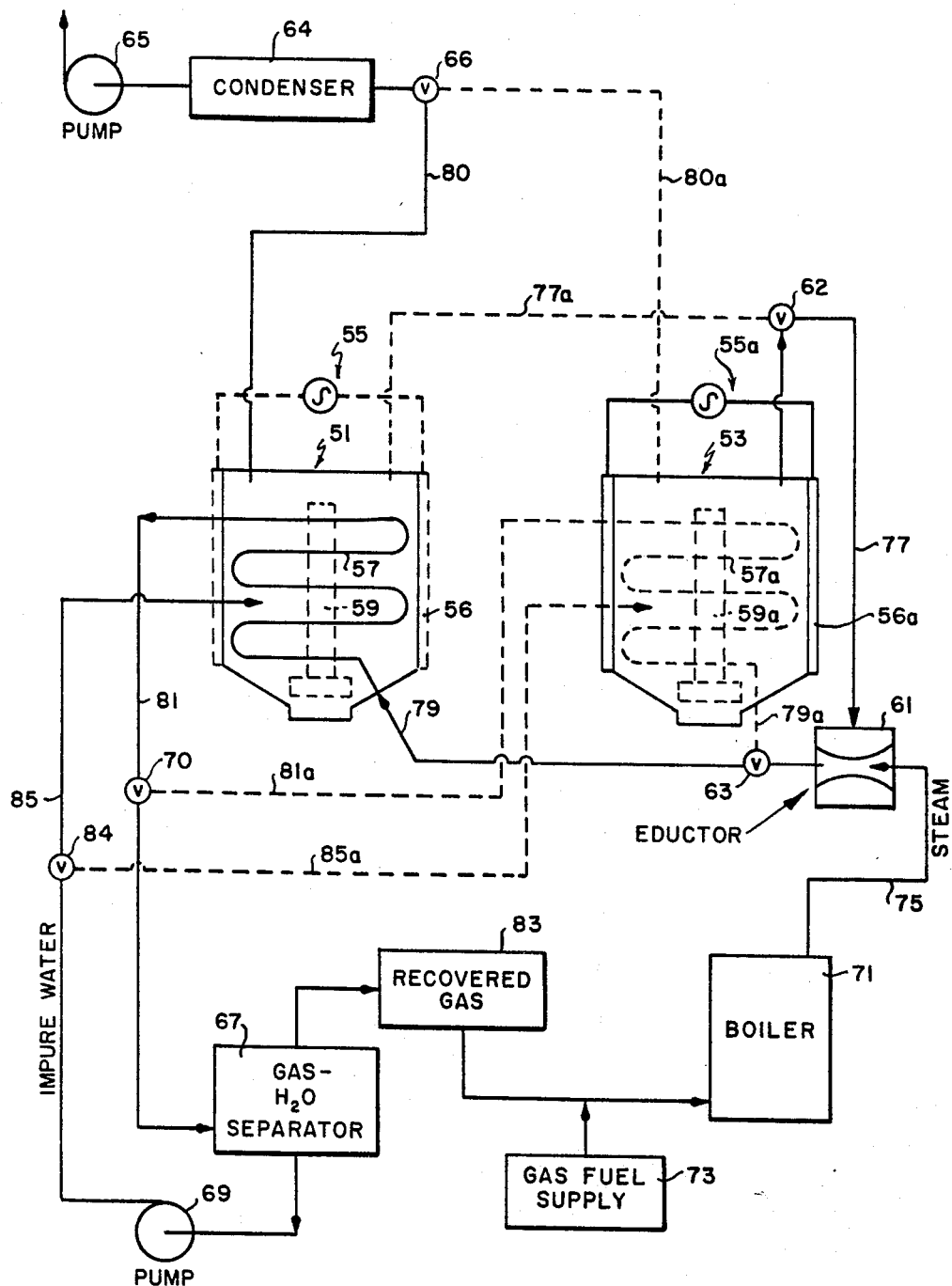
FIG. 6 is a schematic block diagram illustrating another waste material processing arrangement according to one embodiment of the present invention.

In the embodiment of FIG. 6, there is illustrated in schematic block diagram form a commercial-scale waste treatment system. Two identical pressure-tight waste treatment tanks 51 and 53 are employed in this form of the commercial process. By means of any suitable connection control arrangement, identical tanks 51 and 53 are each employed alternatively in two different modes. As illustrated in FIG. 6, although each of the tanks 51 and 53 is provided with identical associated equipment, there is shown in solid lines only that equipment employed in an ancillary mode for recovery of essentially pure water, the other equipment being shown in dotted lines. Similarly, there is shown in solid lines only that equipment associated with tank 53 needed for the other mode. This other mode is the primary mode for reduction of the waste material by destructive distillation.

An important benefit for large scale operations results from this two-mode arrangement. While the waste material is being destructively distilled in the tank 53, heat carried therefrom by the volatile gases is further utilized to "pre-process" the raw waste in the tank 51 for removing water therefrom and purifying said water. Consequently, raw waste material introduced into the tank 51 is dewatered and partially heated prior to destructive distillation thereof in the tank 51.

Meanwhile, in the tank 53, destructive distillation of already dewatered and partially heated waste is carried out simultaneously with pure water recovery in the tank 53. After the tanks 51 and 53 have operated in these modes appropriate changes in equipment connections are made so that the tank 51 then operates in the destructive distillation mode while the tank 53 is provided with fresh waste and operates in the pure water recovery mode.

In carrying out the above-described operations, the tanks 51 and 53 are respectively provided with any suitable heating means such as induction heating means or, as illustrated, dielectric heating means 55 and 55a having electrodes 56 and 56a; heat-exchanging fluid coils 57 and 57a and optionally waste compaction means such as rams 59 and 59a. In addition, there is provided the following equipment connectible to either of the treatment tanks 51 and 53; volatile fluid eduction means 61 connectable to educt fluid from either tank by a valve 62 and connectable to the heating coils 57 of either tank by means of a selector valve 63; a condenser 64 and a pump 65 therefor for withdrawing pure water from either of the tanks by means of a selector valve 66; a gas/water separator 67 and a pump 69 for withdrawing impure water from either of the tanks as selected by the valve 70.

As previously stated, the commercial system of FIG. 6 is shown with the tank 51 connected in the pure water recovery mode and the tank 53 connected for operation in the destructive distillation mode. For clarity, only those elements currently in use in one of said two modes are shown in solid lines. In FIG. 6, the dashed-line, functionally identical counterparts of the solid-line elements are given the same respective reference numerals accompanied by the subscript "a."

A boiler 71 supplied by fuel (e.g., gas) from a primary source of supply, 73 provides steam which is drawn off from the boiler 71 by means of a conduit 75 connected to the eductor 61.

The treatment tank 53, shown operating in its destructive distillation mode, produces hot volatile gases by dielectric heating of the waste therein. These gases are fed to the eductor 61 by means of a condut 77. The steam and hot gases are mixed in the eductor 61 and are fed thru the valve 63 and via a conduit 79 to the heating coils 57 of the tank 51. Raw waste in the tank 51 is heated by the hot gases in the coils 57.

The pump 65 acting through the condenser 64 and the valve 66 maintains a partial vacuum in the tank 51 so that water is boiled off from the raw waste in the tank 51 at relatively low temperatures. This water is fed via a conduit 80 to the condenser 64 which provides essentially pure water. This pure water is fed to commercial fresh water supplies or to further conventional processing plants if desired.

The temperature of the steam is lowered by the heat exchanging action of the coils 57. Thus, the fluids leaving the coils 57 consist of a mixture of water and gas. This mixture is fed to the water/gas separator 67 via the valve 70 and a conduit 81. The separated gas is fed to a gas storage tank 83 from which said gas may be employed as a secondary source of fuel for the boiler 71.

The impure water retrieved in the separator 67 is passed by the pump 69 via a selector valve 84 and a conduit 85 to the tank 51 operating in the water recovery mode. This impure water is also recovered as pure water in the manner just described.

When substantially all of the water has been removed from the waste in the tank 51, the tank 51 is switched to operate in the destructive distillation mode. The tank 53, in which destructive distillation has been carried out, is caused to discharge its processed waste in any suitable manner, and receives a fresh batch of raw waste from which water will be recovered. In short, the tank 51 is caused to operate as did tank 53, and the tank 53 is caused to operate as did tank 51 by simply changing the settings of the valves 62, 63, 66, 70 and 84 so that the dashed-line conduits 77a, 79a, 80a, 81a and 85a become active, and also by deenergizing the dielectric heating means 55a and energizing the dielectric heating means 55.

Of course, as an optional further step, the rams 59 and 59a may be employed in the respective tanks 51 and 53 to compact the waste, in the manner described in conjunction with FIGS. 1–5, to produce the previously described novel blocks according to the invention.

In those instances where compaction of the waste material into blocks is desired, it is necessary to mix with the waste material, prior to compacting, a suitable binding agent in amounts small compared with the amount of waste, to produce cohesive blocks.

Examples of binders which may be employed are binders from the methane series of hydro-carbons, such as candle wax; sodium silicate; lubrication oils; gums and carboxy methyl cellulose. Any suitable means, automatic or manual, may be employed for inserting the binder into the waste material prior to compaction.

In carrying out the process according to the invention, the temperature range for destructive distillation may be from about 1000° F. to about 1400° F. In this temperature range, essentially all of the odor-producing greases, oils and water present in garbage or sewage become volatile gases which are drawn off by the gas eduction means.

Inasmuch as some of these gases may be water soluble, further water purification means may be necessary in conjunction with the commercial-scale embodiment illustrated in FIG. 6.

In general, the time required for destructive distillation may be about 30 minutes with the embodiment of FIG. 1 and somewhat less time with the FIGS. 3, 4 and 6 embodiments. However, it is obvious that the length of time required for destructive distillation may vary considerably depending upon the initial temperature of the waste material, the amount of waste material in relation to the size of the processing tank, the dielectric properties of the garbage or sewage (where dielectric heating means are employed) and the efficiency of the heating means used. For compaction, pressures of from about 1200–1600 p.s.i. may be used.

In a working model built according to a specific laboratory form of the invention a magnetic waste material container had a diameter of about six inches for a length of twelve inches tapering to 1⅜ inches diameter for four inches. The container was surrounded by induction heating coils for nearly its entire length. The coils were connected to an A.C. source of about 400 c.p.s. A vacuum eductor was provided for the container.

About six pounds of raw garbage (consisting essentially of vegetable and meat scraps and some bones) was placed in the container, and the container was heated at about 1400° F. for approximately one-half hour during which the volatile gases were drawn off.

After heating, the top of the container was removed and the container was placed in an arbor press. A small amount of candle wax was added to the residual mass of waste material in the container. The residual waste material in the bottom of the container was then compacted by a piston at about 1400 p.s.i. for about two seconds.

The resulting block of residual waste was odorless and had a specific gravity of 1.65. The block did not disintegrate in water. No oil slick or odor was evident in the water used to immerse the block. The block, after drying for several weeks, was saturated with lighter fluid and ignited. As soon as the supply of lighter fluid was exhausted, the flame went out. The block did not smolder. The physical characteristics of the block were not changed by the attempt to burn it. However, the surface for a depth of about 1/32″ was soft and crumbly. This is undoubtedly due to local destruction of the wax binders. The soft surface of the block was scraped off and placed in water. These scrapings sank.

The block was dropped on a concrete slab from a height of 6 feet. It did not break.

Obviously, the particular apparatus employed may take other forms as desired for optimum economy in the waste treatment process. Nuclear energy producing means may be employed as the prime source of heating means and of fluid at high pressure to operate the ram. Solar heating means may be employed. Heat produced by conventional furnaces may also be utilized.

Obviously many modifications and variation of the present invention are possible in the light of the above teachings. It is therefore to be understood that within the scope of the appended claims the invention may be practiced otherwise than as specifically described.

What is claimed is:

1. A dense, hard, cohesive non-flammable block formed from raw garbage or sewage, said block having the property of being essentially impervious to, and odorless upon long exposure to, air, water or earth, and said block having a specific gravity greater than 1.0, made by the process comprising the steps of:
   destructively distilling raw garbage at a pressure in the range of 1200–1600 p.s.i. and a temperature of 1000–1400° F., to form a residual mass;
   mixing the residual mass with a binding agent; and compressing the mixture of the residual mass and the binding agent.

2. The method of forming a dense, hard, odorless cohesive block from raw garbage or sewage comprising the steps of:
   destructively distilling raw garbage or sewage to form a residual mass of ashen waste material essentially devoid of liquid;
   mixing the residual mass with a binding agent, and compressing the residual mass into a block having a density greater than water.

3. The method according to claim 2 wherein the step of destructive distillation comprises:
   subjecting the raw garbage or sewage to pressures in the range of 1200–1600 p.s.i. and to temperatures in the range of 1000–1400° F.

4. The method according to claim 2 wherein the specific gravity of said block so produced is greater than 1.0 .

5. Apparatus for producing from raw garbage or sewage a mass of ashen particles which are essentially impervious to disintegration in air, water and earth, said ashen material having a specific gravity greater than that of water, said apparatus comprising:
   container means for receiving the raw garbage or sewage;
   means for heating the waste material in said container means; and
   venturi eduction means for removing gases and vapors occurring during heating, whereby there is produced a residual mass of ashen particles by destructive distillation.

6. A system for producing from raw waste material non-flammable ashen material which is odorless when exposed to water, air and earth, and which is essentially impervious to disintegration in air, water and earth, said material having a specific gravity greater than that of water, said system comprising:
   first and second pressure-tight tanks for receiving the waste material;
   electrical heating means in each of said tanks for supplying heat for destructive distillation of the waste material in each of said tanks;
   fluid eduction means fluidly connected to either of said tanks for withdrawing volatile gases therefrom;
   fluid-carrying heat-exchanging means for each of said tanks and fluidly connected to said fluid eduction means for receiving hot fluids therefrom;
   gas-water separation means fluidly connected to either of said heat-exchanging means for providing impure water to be heated in either of said tanks and for providing gas for use as fuel;
   whereby fluids drawn off by said fluid eduction means during destructive distillation of waste material in one of said tanks provides at least a portion of the heat for the heat exchanging means for the other of said tanks wherein the waste material is pre-processed and wherein the impure water from the gas-water separation means may be heated for purification purposes.

7. The system according to claim 6 but further characterized by said system further comprising pump means and condenser means connectable to either of said tanks for producing essentially pure water from the impure water supplied from the gas-water separation means and the water entrained waste material during pre-processing of the waste material.

8. The system as defined according to claim 7 but further characterized by said electrical heating means comprising dielectric heating means.

9. The system as defined according to claim 7 but further characterized by said electrical heating means comprising induction heating means.

10. A system for producing from raw waste material non-flammable ashen material which is odorless when exposed to water, air and earth, and which is essentially impervious to disintegration in air, water and earth, said material having a specific gravity greater than that of water, said system comprising:
   first and second primary means for destructively distilling respective separate batches of raw waste material;
   first and second heating means for dewatering the raw waste material prior to destructive distillation thereof, thereby providing a source of reclaimable water and gas usable as fuel, and a mass of partially processed waste material;
   conduit means interconnecting said first primary means to said second heating means and said second primary means to said first heating means, whereby hot volatile fluids produced by each respective one of said primary means serves as a heat source for its connectively associated secondary heating means;
   a source of heat for each of said primary means; and
   each of said primary means comprising compacting means whereby the ashen material after being mixed with a binding agent, and upon compaction thereof, there is produced hard, dense, solid blocks of specific gravity substantially greater than the specific gravity of water.

References Cited

UNITED STATES PATENTS

| | | | |
|---|---|---|---|
| 501,760 | 7/1893 | Best et al. | |
| 949,326 | 2/1910 | Maul | 201—5 |
| 1,133,380 | 3/1915 | Keener | 106—84 |
| 1,396,173 | 11/1921 | Fenton | 201—35 |
| 1,432,740 | 10/1922 | Le Blanc. | |
| 3,131,238 | 4/1964 | Carnall et al. | |
| 3,150,619 | 9/1964 | Brucken et al. | 110—8 |

FOREIGN PATENTS 517,798   2/1940   Great Britain.

JOSEPH SCOVRONEK, *Primary Examiner.*